United States Patent
Säufferer

[11] 3,840,731
[45] Oct. 8, 1974

[54] FOG LIGHT FOR MOTOR VEHICLES

[75] Inventor: Helmut Säufferer, Esslingen/N, Germany

[73] Assignee: Daimler-Benz Aktiengesellschaft, Stuttgart, Germany

[22] Filed: July 19, 1971

[21] Appl. No.: 163,675

[30] Foreign Application Priority Data
July 18, 1970 Germany............................ 2035741

[52] U.S. Cl................................. 240/9.5, 350/156
[51] Int. Cl. .............................................. F21v 9/00
[58] Field of Search ........... 240/9.5, 41.5; 350/156, 350/159

[56] References Cited
UNITED STATES PATENTS

| 2,099,694 | 11/1937 | Land | 240/9.5 X |
|---|---|---|---|
| 2,165,974 | 7/1939 | Land | 240/9.5 X |
| 2,440,133 | 4/1948 | Young | 350/156 |
| 2,856,810 | 10/1958 | Frost | 350/159 |
| 3,272,064 | 9/1966 | Hyndman | 350/156 |

FOREIGN PATENTS OR APPLICATIONS

| 486,836 | 6/1938 | Great Britain | 240/9.5 |
|---|---|---|---|
| 1,048,091 | 11/1966 | Great Britain | 240/9.5 |
| 158,736 | 4/1957 | Sweden | 240/9.5 |

*Primary Examiner*—Louis J. Capozi
*Attorney, Agent, or Firm*—Craig & Antonelli

[57] ABSTRACT

An installation for the better recognition under foggy weather conditions of objects in the light of motor vehicle fog lights, in which the fog lights radiate polarized light and an analyzer is arranged in front of the eyes of the driver which permits the passage of only certain parts of the polarized light.

8 Claims, 5 Drawing Figures

PATENTED OCT 8 1974 3,840,731

FOG LIGHT FOR MOTOR VEHICLES

The present invention relates to an installation for the better recognition of objects during fog in the light of motor vehicle fog lights.

The light radiated by the known fog lights produces as a result of multiple reflections at the fog drops or particles a considerable scattering or diffusion which is subjectively felt as a non-penetrable milky wall, especially at higher light intensities, and thus renders more difficult or even impossible a recognition or noticing of objects by the motor vehicle driver. The scattering is thereby reinforced with increasing light intensity of the fog lights.

The present invention is concerned with the task to provide an installation which considerably improves during foggy conditions the recognition of objects in the light of motor vehicle fog lights.

The underlying problems are solved according to the present invention in that the fog lights radiate polarized light and that an analyzer is arranged in front of the eyes of the motor vehicle driver.

The polarized light radiated by the installation of the fog lights according to the present invention is depolarized to a large extent by the reflection from objects whereas the light reflected from fog drops remains far-reachingly polarized. The polarized light is far-reachingly blocked by the analyzer whereas the light reflected from the objects can pass to a large portion through the analyzer. It is thereby appropriate to orient the passing direction of the analyzer in such a manner that the difference of the light quantities passing through the analyzer which are reflected, on the one hand, from the objects and on the other, from the fog particles, is a maximum. The analyzer therefore need not be oriented in the same manner as the light radiated by the fog lights.

An advantageous construction of the present invention resides in that the analyzer for purposes of changing its direction of transmission is rotatable in its plane. Furthermore, the analyzer may be constructed as removable disk arranged in front of or to the rear of the windshield of the motor vehicle or as eye glasses for the driver. Additionally, the fog light may radiate either linearly or circularly polarized light.

Accordingly, it is an object of the present invention to provide an installation for the better recognition of objects in the lights of fog lights under foggy driving conditions which avoids the aforementioned drawbacks and shortcomings encountered with the fog light systems of the prior art by simple and effective means.

Another object of the present invention resides in an installation which minimizes the subjective apprehension due to the apparent milky wall caused by reflection of light from fog drops in dense fog.

A further object of the present invention resides in a motor vehicle fog light system which considerably improves its effectiveness.

These and other objects, features and advantages of the present invention will become more apparent from the following description when taken in connection with the accompanying drawing which shows, for purposes of illustration only, one embodiment in accordance with the present invention, and wherein.

Figure 1:
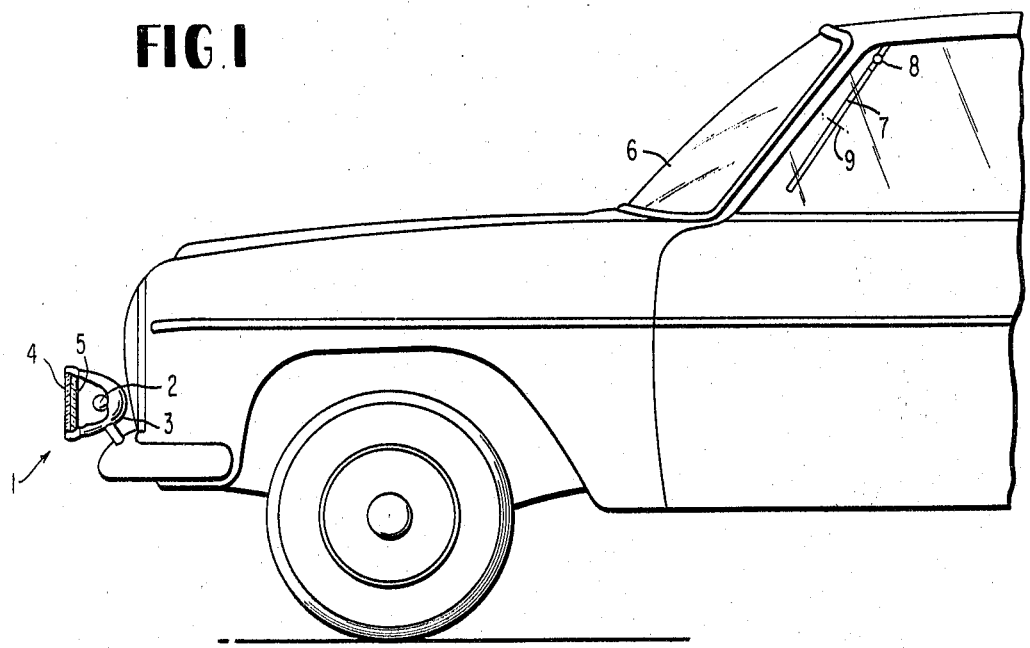
FIG. 1 is a partial side elevational view schematically illustrating one embodiment in accordance with the present invention.

Referring now to the drawing which illustrates a passenger motor vehicle, and more particularly, the front section thereof, a fog light generally designated by reference numeral 1 is mounted in a conventional manner at the motor vehicle. The fog light 1 essentially consists of a light source 2, of a reflector 3, and of a covering pane 4, all of conventional construction. A polarization film 5 of any conventional type is mounted on the covering pane 4 on the inside thereof so that only polarized light can leave the fog light 1. (Fog light 1 shown in cross-section in FIG. 1) An analyzer 7 of conventional construction is arranged in the vehicle passenger space directly behind the windshield 6. The analyzer 7 is rotatably supported about a pivot axis 8 so that in case of non-use, it can be removed out of the field of vision of the motor vehicle driver. Additionally, the analyzer 7 is rotatable in its plane about the axis 9 by any conventional means so that its direction of transmission can be changed. As a result thereof, the vehicle driver can readily determine in dependence especially of the density of the fog, which light quantities reflected, on the one hand, from the objects and on the other, from the fog drops, he will permit to reach his eyes. It is thereby favorable if the resulting image is as full of contrast as possible, i.e., if the difference of the light quantities which the vehicle driver receives on the one hand, from the objects and on the other, from the fog drops, is as large as possible. A considerable portion of the light quantity reflected from the objects, may thereby be blocked by the analyzer 7 as long as only the light quantity disturbing the driver and reflected from the fog drops is reduced with a rotation of the analyzer 7 about its axis, by a larger amount than the light quantity reflected from the objects.

Figure 2:
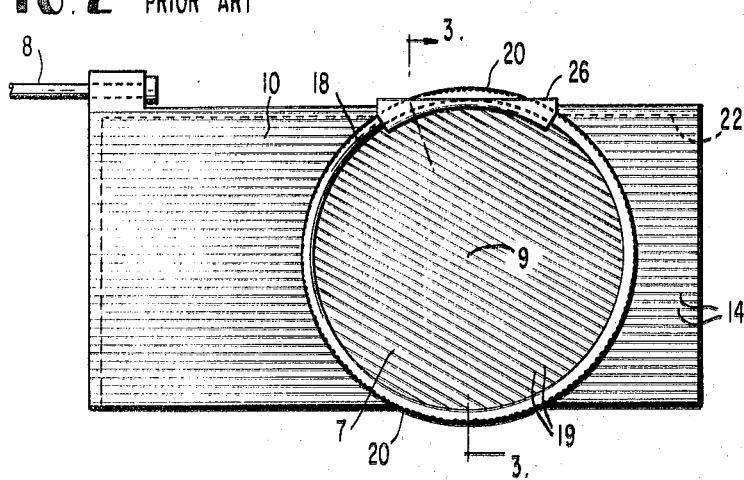
FIG. 2 is an elevational view of a prior art analyzer mounting arrangement that could be used with the present invention.
Figure 3:
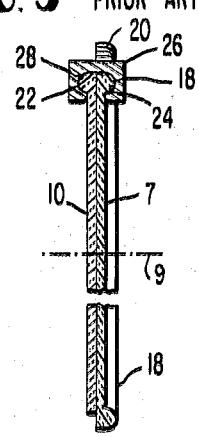
FIG. 3 is an enlarged cross-sectional view taken along line 3—3 of FIG. 2.

FIGS. 2 and 3 illustrate a prior art analyzer mounting arrangement similar to the one disclosed in U.S. Pat. No. 2,856,810, which was issued Oct. 21, 1958.

Referring to FIGS. 2 and 3, a transparent sheet of plane polarizing material 10 is shown attached to a vehicle by pivotal mounting 12 which enables the visor accommodating the sheet material 10 to be moved into and out of position in line of sight of the driver. Sheet 10 has its polarizing axis in a plane which is oriented with respect to the vehicle to filter out the glare producing light reflected therefrom in a conventional manner. A transparent disc of plane polarizing material 7 is superimposed over the sheet 10 and is mounted for free rotation relative thereto. Thus, the plane of polarization of the disc, represented by parallel lines 19, may be oriented relative to the plane of polarization of the sheet, represented by parallel lines 14, to vary the amount of light transmitted through the disc between wide limits. This property of variable light extinction accomplished by overlapping sheets of plane polarizing material is a well known property of polarizing substances such as that sold under the trademark Polaroid.

Figure 4:
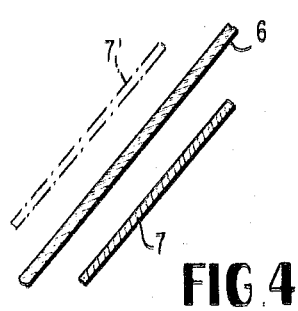
FIG. 4 is a partial schematic side cross-sectional view showing respective optional positions of the analyzer in accordance with the present invention.
Figure 5:
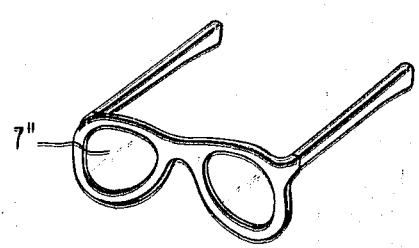
FIG. 5 is a schematic view of eyeglasses that could be used as an analyzer.

It will be seen that the disc 7 is provided with a circumferential bead 18 which is provided with a knurled outer edge 20 to facilitate movement thereof. A longitudinal bead 22 is provided on the upper edge of sheet 10. Bead 18 of the disc is supported for rotational movement within arc like groove 24 of slide 26. Arc like groove 24 opens through the top of the slide to permit access to the knurled edge of the disc so that the disc can be rotated about its axis of rotation 9. Slide 26 is also provided with a groove 28 to receive the longitudinal bead 22 of the sheet for slidable movement therein. FIG. 4 shows optional positioning of analyzer 7' (dash lines) in front of the windshield, as well as the position of analyzer 7 behind the windshield. FIG. 5 schematically illustrates eyeglasses 7" that could be used as an analyzer with the present invention.

While I have shown and described only one embodiment in accordance with the present invention, it is understood that the same is not limited thereto, but is susceptible of numerous changes and modifications as known to those skilled in the art, and I therefore do not wish to be limited to the details shown and described herein, but intend to cover all such changes and modifications as are encompassed by the scope of the appended claims.

I claim:

1. A lighting and observation installation for a motor vehicle which improves vehicle driver visibility during foggy weather conditions; said installation comprising: motor vehicle fog lights having means for radiating polarized light over an area in front of a motor vehicle which supports said fog lights, and analyzer means positioned on said vehicle in a position interposed between a portion of the vehicle occupied by the eyes of a vehicle driver and said area in front of the motor vehicle, said analyzer means including means for controlling the relative amount of light reflected from objects in said area and from fog droplets in said area which reaches the driver's eyes, wherein said analyzer means is mounted for rotatable movement in its plane to accommodate adjustment of the analyzer means by the driver so that the relative amounts of light reflected from objects and fog droplets can be readily varied by the driver for varying fog and road conditions to optomize the difference between the light reflected from the objects and the fog droplets.

2. An installation according to claim 1, characterized in that the analyzer means is constituted by a disk located adjacent the windshield of the vehicle.

3. An installation according to claim 2, characterized in that said disk is removably arranged.

4. An installation according to claim 3, characterized in that said disk is arranged in front of the windshield.

5. An installation according to claim 3, characterized in that said disk is arranged behind the windshield.

6. An installation according to claim 1, characterized in that said analyzer means is constituted by eye glasses for the driver.

7. An installation according to claim 1, characterized in that the fog light radiates linearly polarized light.

8. An installation according to claim 1, characterized in that the fog light radiates circularly polarized light.

* * * * *